United States Patent
Brehm et al.

(10) Patent No.: US 9,968,866 B2
(45) Date of Patent: May 15, 2018

(54) PROCESS FOR DEFOAMING AQUEOUS COMPOSITIONS CONTAINING SURFACTANTS

(71) Applicant: WACKER CHEMIE AG, Munich (DE)

(72) Inventors: Christof Brehm, Burghausen (DE); Elisabeth Hoelzlwimmer, Simbach (DE)

(73) Assignee: WACKER CHEMIE AG, Munich (DE)

( * ) Notice: Subject to any disclaimer, the term of this patent is extended or adjusted under 35 U.S.C. 154(b) by 89 days.

(21) Appl. No.: 14/896,622

(22) PCT Filed: Jun. 6, 2014

(86) PCT No.: PCT/EP2014/061836
§ 371 (c)(1),
(2) Date: Dec. 7, 2015

(87) PCT Pub. No.: WO2014/198665
PCT Pub. Date: Dec. 18, 2014

(65) Prior Publication Data
US 2016/0121239 A1 May 5, 2016

(30) Foreign Application Priority Data

Jun. 10, 2013 (DE) .......... 10 2013 210 813

(51) Int. Cl.
| | |
|---|---|
| *C11D 3/37* | (2006.01) |
| *C09K 3/00* | (2006.01) |
| *B01D 19/04* | (2006.01) |
| *C08L 83/04* | (2006.01) |
| *C11D 3/00* | (2006.01) |
| *C11D 3/16* | (2006.01) |
| *C08G 77/16* | (2006.01) |
| *C08G 77/388* | (2006.01) |
| *C08G 77/00* | (2006.01) |

(52) U.S. Cl.
CPC ..... *B01D 19/0409* (2013.01); *B01D 19/0413* (2013.01); *C08L 83/04* (2013.01); *C11D 3/0026* (2013.01); *C11D 3/162* (2013.01); *C11D 3/373* (2013.01); *C08G 77/16* (2013.01); *C08G 77/388* (2013.01); *C08G 77/70* (2013.01)

(58) Field of Classification Search
None
See application file for complete search history.

(56) References Cited

U.S. PATENT DOCUMENTS

| | | | |
|---|---|---|---|
| 3,383,327 A | 5/1968 | Sullivan | |
| 3,560,401 A | 2/1971 | O'Hara et al. | |
| 7,619,043 B2 * | 11/2009 | Rautschek | B01D 19/0404 |
| | | | 516/117 |
| 7,632,890 B2 | 12/2009 | Creutz et al. | |
| 8,114,950 B2 | 2/2012 | Herzig | |
| 2008/0293907 A1 | 11/2008 | Herzig et al. | |

FOREIGN PATENT DOCUMENTS

| | | |
|---|---|---|
| CN | 101296930 A | 10/2008 |
| DE | 102006044839 A1 | 4/2008 |
| EP | 0 266 863 A1 | 5/1988 |
| EP | 0 578 424 A2 | 1/1994 |
| EP | 1 075 863 B1 | 2/2001 |
| EP | 1 075 864 B1 | 2/2001 |
| EP | 1 118 655 A1 | 7/2001 |
| WO | 2007/060113 A2 | 5/2007 |
| WO | 2012/075962 A1 | 6/2012 |

* cited by examiner

*Primary Examiner* — Tae H Yoon
(74) *Attorney, Agent, or Firm* — Brooks Kushman P.C.

(57) ABSTRACT

Efficient defoamer and foam prevention formulations contain an organopolysiloxane defoamer and an efficiency promoting waxy β-ketocarbonyl-functional organosilicon compound. The compositions also preferably contain a filler and a silicone resin, and are highly efficient in surfactant-containing aqueous systems such as detergents and cleaners.

17 Claims, No Drawings

PROCESS FOR DEFOAMING AQUEOUS COMPOSITIONS CONTAINING SURFACTANTS

CROSS REFERENCE TO RELATED APPLICATIONS

This application is the U.S. National Phase of PCT Appln. No. PCT/EP2014/062676 filed Jun. 17, 2014, which claims priority to German Application No. 10 2013 212 908.4 filed Jul. 2, 2013, the disclosures of which are incorporated in their entirety by reference herein.

BACKGROUND OF THE INVENTION

1. Field of the Invention

The invention relates to a method for defoaming and/or for preventing the foaming of aqueous compositions comprising surfactants, on the basis of siloxanes.

2. Description of the Related Art

In many liquid systems, more particularly aqueous systems, which include surface-active compounds either as wanted or else unwanted constituents, problems due to foaming may occur if these systems are brought into more or less intense contact with gaseous substances, as for example when gasifying waste waters, when intensively stirring liquids, in distillation, washing, or coloring operations, or during dispensing procedures.

Controlling this foam may be accomplished mechanically or through the addition of defoamers. In this context, siloxane-based defoamers have proven themselves particularly useful.

Defoamers based on siloxanes are prepared according to U.S. Pat. No. 3,383,327 A, for example, by heating hydrophilic silica in polydimethylsiloxanes. The activity of such defoamers can be improved by using basic catalysts (U.S. Pat. No. 3,560,401 A).

Proposed alongside polydimethylsiloxanes are organopolysiloxanes which, as well as methyl groups, also carry other relatively long-chain, aliphatic or aromatic hydrocarbon groups on the silicon. Oftentimes the aim of introducing long alkyl groups is to enhance compatibility with mineral oils which may be present in defoamer compositions. Furthermore, defoamer formulations with organopolysiloxanes having relatively long alkyl groups or phenyl groups exhibit an improved defoamer effect by comparison with defoamer formulations comprising polydimethylsiloxanes. Defoamer formulations of these kinds are described, for example, in EP 578 424 A2, where organopolysiloxanes having alkyl groups with 9 to 35 carbon atoms are used, and in EP 1 075 863 and EP 1 075 864, where organopolysiloxanes with at least one Si-bonded substituent of the formula X-Ph (X=divalent alkylene group, Ph=phenyl group) are used, and in U.S. Pat. No. 7,619,043 B2, where organopolysiloxanes with aromatic hydrocarbon radicals are used, or in US 2009/0137446 A1.

However, in strongly foaming systems, especially those rich in anionic surfactants, the defoamer formulations produced in accordance with the prior art do not always display adequate activity.

Attempts are therefore being made to boost the defoamer activity by combination of customary silicone defoamers with other materials, including waxlike non-silicone materials. Accordingly, in EP 266 863 A1, alkylphosphoric acid or salts thereof are added as antifoam promoters. In EP 1 118 655 A1, unsaturated alcohols in combination with silicone antifoams are described for supporting the ability of the silicone antifoams. U.S. Pat. No. 7,632,890 B2 describes the addition of relatively strongly polar components preferably possessing an active hydrogen atom, examples being fatty alcohols, ethoxylated fatty acids, or ethoxylated alkylphenols, or else partial esters of polyols, such as monoesters of glycerol and fatty acids. Together with waxlike addition compounds which comprise an apolar polyol ester, these components are combined with the silicone defoamers.

A problem of the nonsilicone materials used is their compatibility with the silicone defoamers whose activity is to be improved.

SUMMARY OF THE INVENTION

The object of the invention was therefore to provide defoamer formulations based on siloxanes that are obtained by combining customary silicone defoamers and an activity booster, for which problems of compatibility are diminished, and which exhibit enhanced activity, particularly in surfactant-rich, strongly foaming media. These and other objects are achieved by the invention, which combines organopolysiloxanes with wax-like β-ketocarbonyl-functional organosilicon compounds as defined herein.

DETAILED DESCRIPTION OF THE PREFERRED EMBODIMENTS

The invention provides a method for defoaming and/or for preventing the foaming of aqueous compositions comprising surfactants, by addition of defoamer formulations comprising (A) polydiorganosiloxanes which comprise units of the formula

(I)

where
R may be identical or different and is a monovalent, optionally substituted hydrocarbon radical having 1 to 36 carbon atoms, preferably an alkyl group having 1 to 36 carbon atoms, an aryl group having 6 to 36 carbon atoms, or an aralkyl group having 7 to 36 carbon atoms, and (B) waxlike, β-ketocarbonyl-functional organosilicon compounds which comprise at least one Si-bonded radical B of the general formula

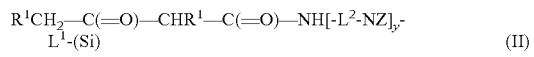

(II)

where
$R^1$ is a monovalent, optionally substituted hydrocarbon radical having at least 12 C atoms, preferably having at least 14 C atoms,
Z is a radical of the formula $R^1CH_2$—C(=O)—$CHR^1$—C(=O)— or is a radical $R^2$,
$R^2$ is a hydrogen atom or a monovalent hydrocarbon radical having 1 to 18 C atoms, preferably a $C_1$-$C_4$-alkyl radical, preferably a hydrogen atom,
$L^1$ is a divalent hydrocarbon radical having 1 to 18 C atoms, $L^2$ is a divalent hydrocarbon radical having 1 to 18 C atoms, y is 0 or 1, and (Si)— is the bond to the Si atom.

The viscosity of the polydiorganosiloxanes (A) of the invention is preferably at least 50 mPa·s, more preferably at least 550 mPa·s, and preferably not more than 100 000 mPa·s, more preferably not more than 10,000 mPa·s, in each case at 25° C. and 101.425 kPa.

Polydiorganosiloxanes (A) used are preferably those of the general formula $$R_3SiO(R_2SiO)_dSiR_3 \tag{I'}$$

where

R has the definition specified for it above, d is an integer and has a value such that the viscosity of the polydiorganosiloxanes (A) is at least 50 mPa·s, preferably at least 550 mPa·s, and not more than 100 000 mPa·s, preferably not more than 10,000 mPa·s, in each case at 25° C. and 101.425 kPa.

Preferably d is an integer and is at least 30, more preferably at least 40, and most preferably at least 50, and preferably not more than 1500, more preferably not more than 1000, and most preferably not more than 500.

One kind of polydiorganosiloxane (A) or a mixture of at least two kinds of polydiorganosiloxanes (A) can be used.

R preferably denotes a monovalent hydrocarbon radical which is free from aliphatic carbon-carbon multiple bonds and has 1 to 18 carbon atoms.

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl, and methylcyclohexyl radicals; aryl radicals such as the phenyl, naphthyl, anthryl, and phenanthryl radical; alkaryl radicals such as the o-, m-, and p-tolyl radicals, xylyl radicals, and ethylphenyl radicals; and aralkyl radicals such as the benzyl radical, the α- and the β-phenylethyl radical, and also the 2-phenylpropyl radical.

The hydrocarbon radicals R may also comprise ether or polyether groups.

Preferred examples of R are the methyl, ethyl, octyl, dodecyl, 2-phenylpropyl, and phenyl radicals.

The waxlike, β-ketocarbonyl-functional organosilicon compounds (B) of the invention may be oligomeric or polymeric organosiloxanes, preferably organopolysiloxanes. They comprise preferably at least 3, more preferably at least 5 and most preferably at least 10 Si atoms and preferably up to 2000 Si atoms, more preferably up to 1000 Si atoms, and most preferably up to 700 Si atoms.

The waxlike, β-ketocarbonyl-functional organosilicon compounds (B) used in accordance with the invention are known and are described in U.S. Pat. No. 8,114,950 B2 (incorporated by reference), including their preparation.

According to U.S. Pat. No. 8,114,950 B2, an advantage of the β-ketocarbonyl-functional organopolysiloxanes is that in spite of relatively long-chain alkyl chains they still retain their silicone character and consequently are highly compatible with polydiorganosiloxanes.

The waxlike, β-ketocarbonyl-functional organosilicon compounds (B) are preferably prepared by reacting organosilicon compounds (1) having at least one radical A of the general formula $$NH_2[-L^2-NR^2]_y-L^1-(Si) \tag{III}$$

with diketenes (2) of the general formula

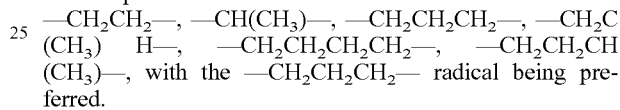

where $R^1$, $R^2$, $L^1$, $L^2$, y and (Si)— have the definitions specified above for them.

The radical $R^1$ preferably has not more than 18 C atoms. More preferably the radical $R^1$ has 14 to 16 C atoms, and most preferably is a $C_{14}$-$C_{16}$ alkyl radical.

Examples of radicals $R^1$ are the dodecyl, tetradecyl, hexadecyl, and octadecyl radicals.

Preferred examples of radicals $R^2$ are the hydrogen atom and the methyl and ethyl radicals.

Examples of radicals $L^1$ are
—CH$_2$CH$_2$—, —CH(CH$_3$)—, —CH$_2$CH$_2$CH$_2$—, —CH$_2$C(CH$_3$)H—, —CH$_2$CH$_2$CH$_2$CH$_2$—, —CH$_2$CH$_2$CH(CH$_3$)—, with the —CH$_2$CH$_2$CH$_2$— radical being preferred.

Examples of radicals $L^2$ are
—CH$_2$CH$_2$—, —CH(CH$_3$)—, —CH$_2$CH$_2$CH$_2$—, —CH$_2$C(CH$_3$)H—, —CH$_2$CH$_2$CH$_2$CH$_2$—, —CH$_2$CH$_2$CH(CH$_3$)—, with the —CH$_2$CH$_2$— radical being preferred.

Examples of radicals A are
—CH$_2$CH$_2$CH$_2$NH$_2$,
—CH$_2$CH$_2$CH$_2$NHCH$_3$,
—CH$_2$CH(CH$_3$) NH$_2$,
—CH$_2$CH$_2$CH(CH$_3$)NH$_2$, and
—CH$_2$CH$_2$CH$_2$NHCH$_2$CH$_2$NH$_2$.

As organosilicon compounds (1) having at least one radical A it is possible to use oligomeric or polymeric organosiloxanes. They comprise preferably at least 3, more preferably at least 5, and most preferably at least 10 Si atoms and preferably up to 2000 Si atoms, more preferably up to 1000 Si atoms, and most preferably up to 700 Si atoms.

As organosilicon compounds (1), preference is given to using organopolysiloxanes consisting of units of the general formula $$A_aR^3_b(OR^4)_cSiO_{\frac{4-(a+b+c)}{2}} \tag{V}$$

where

A is a radical of the formula (III), $R^3$ is a monovalent, optionally substituted hydrocarbon radical having 1 to 18 C atoms per radical, $R^4$ is a hydrogen atom or an alkyl radical having 1 to 8 C atoms, a is 0 or 1, b is 0, 1, 2, or 3, and c is 0 or 1, with the proviso that the sum a+b+c is less than or equal to 3 and on average there is at least one radical A per molecule.

Examples of radicals $R^3$ are alkyl radicals such as the methyl, ethyl, n-propyl, iso-propyl, 1-n-butyl, 2-n-butyl, iso-butyl, tert-butyl, n-pentyl, iso-pentyl, neo-pentyl, and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; alkenyl radicals such as the vinyl, 5-hexenyl, cyclohexenyl, 1-propenyl, allyl, 3-butenyl, and 4-pentenyl radicals; alkynyl radicals such as the ethynyl, propargyl, and 1-propynyl radical; aryl radicals such as the phenyl, naphthyl, anthryl, and phenanthryl radical; alkaryl radicals such as the o-, m-, and p-tolyl radicals, xylyl radicals, and ethylphenyl radicals; and aralkyl radicals such as the benzyl radical, the α- and the β-phenylethyl radicals, and also the 2-phenylpropyl radical.

Examples of alkyl radicals $R^4$ are the methyl, ethyl, n-propyl, isopropyl, and the n-butyl radical.

Preferred as organosilicon compounds (1) are organopolysiloxanes of the general formula

   (VI), with the proviso that there is on average at least one radical A per molecule,
and particular preference is given to organopolysiloxanes of the general formula

   (VII), where
A is a radical of the formula (III),
$R^3$ and $R^4$ have the definitions specified for them above
g is 0 or 1, preferably 1,
h is 0 or 1,
l is an integer and is at least 1, preferably at least 10, and not more than 2000, preferably not more than 700, and
k is an integer and is at least 1 and not more than 200, preferably not more than 20.

Particular preference is therefore given to using linear organopolysiloxanes having pendant amino groups A.

The organosilicon compounds (1) having at least one radical A that are used in preparing the β-ketocarbonyl-functional organosilicon compounds of the invention preferably have an amine number greater than 0.7 meq/g, more preferably greater than 1.2 meq/g. The amine number here is determined according to DIN 16945.

Waxlike, β-ketocarbonyl-functional organosilicon compounds (B) used are therefore preferably organopolysiloxanes of the general formula

   (VIII)

where
B is a radical of the formula (II) and
$R^3$, $R^4$, a, b, and c have the definitions specified for them above,
with the proviso that the sum a+b+c is less than or equal to 3 and there is on average at least one radical B per molecule.

Preferred examples of waxlike, β-ketocarbonyl-functional organosilicon compounds (B) are therefore organopolysiloxanes of the general formula

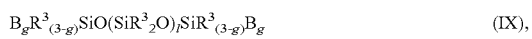   (IX), with the proviso that there is on average at least one radical B per molecule,
and organopolysiloxanes of the general formula

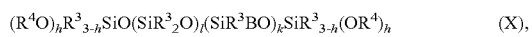   (X), where B is a radical of the formula (II) and
$R^3$, $R^4$, g, h, l and k have the definitions specified for them above.

Particularly preferred are β-ketocarbonyl-functional organopolysiloxanes of the general formula

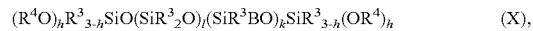   (X), where B is a radical of the formula (II) and
$R^3$, $R^4$, g, h, l and k have the definitions specified for them above.

Particular preference is therefore given to using linear β-ketocarbonyl-functional organopolysiloxanes (B) having pendant β-ketocarbonyl-functional radicals B.

The invention accordingly provides defoamer formulations comprising
(A) polydiorganosiloxanes which comprise units of the formula

   (I)

where
R has the definition specified for it above, and
(B) waxlike, β-ketocarbonyl-functional organosilicon compounds of the general formula

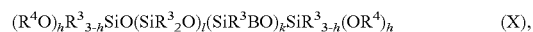   (X), where B is a radical of the formula (II) and
$R^3$, $R^4$, h, l and k have the definitions specified for them above.

The waxlike, β-ketocarbonyl-functional organosilicon compounds (B) that are used with preference in the defoamer formulations are preferably prepared by reacting organopolysiloxanes (1) having at least one radical A of the general formula

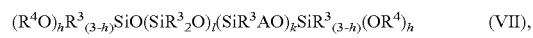   (VII), which preferably have an amine number of greater than 0.7 meq/g,
where A is a radical of the formula (III) and
$R^3$, $R^4$, h, l and k have the definitions specified for them above,
with diketenes (2) of the general formula

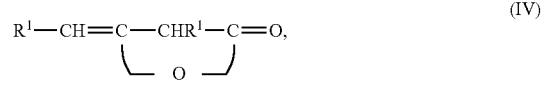   (IV)

where $R^1$ has the definition specified for it above.

In the waxlike, β-ketocarbonyl-functional organosilicon compounds (B) of the invention, the radicals $R^1$ are present in an amount of preferably at least 32 wt %, more preferably at least 35 wt %, most preferably at least 40 wt %, and preferably not more than 60 wt %, based in each case on the total weight of the waxlike, β-ketocarbonyl-functional organosilicon compounds. One kind of β-ketocarbonyl-functional organosilicon compounds (B) or a mixture of at least two kinds of β-ketocarbonyl-functional organosilicon compounds (B) can be used.

The defoamer formulations of the invention preferably comprise, in addition to components (A) and (B),
(C) fillers,
(D) organopolysiloxane resins composed of units of the general formula

   (XI), in which
$R^5$ may be identical or different and is a hydrogen atom or a monovalent, optionally substituted, SiC-bonded hydrocarbon radical having 1 to 30 C atoms, $R^6$ may be identical or different and is a hydrogen atom or a monovalent, optionally substituted hydrocarbon radical having 1 to 4 C atoms, e is 0, 1, 2 or 3, and f is 0, 1, 2 or 3,
with the proviso that the sum e+f is less than or equal to 3 and in less than 50% of all units of the formula (XI) in the organopolysiloxane resin, the sum e+f is 2, optionally (E) polyorganosiloxanes, different from polydiorganosiloxanes (A), of the general formula

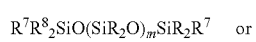 (XIIa)

or

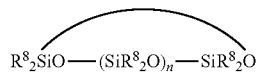 (XIIb)

where $R^7$ may be identical or different and may be $R^8$ or —$OR^9$, $R^8$ may be identical or different and is a monovalent, optionally substituted hydrocarbon radical having 1 to 18 C atoms per radical, $R^9$ is a hydrogen atom or a monovalent, optionally substituted hydrocarbon radical having 1 to 25 C atoms, m is an integer, m preferably being selected such that the polyorganosiloxanes of the formula (XIIa) have a viscosity at 25° C. and 101.425 kPa of 10 to 1 000 000 mPas, n is an integer, n preferably being selected such that the polyorganosiloxanes of the formula (XIIb) have a viscosity at 25° C. and 101.425 kPa of 2 to 15 mPas,
with the proviso that the polyorganosiloxanes may also include small fractions of branching instances, preferably T units ($R^8SiO_{3/2}$) and Q units ($SiO_2$), optionally (F) a water-insoluble organic compound, optionally (G) polyether-modified polysiloxanes, which may be linear or branched and which comprise at least one polyether group, and optionally (H) an alkaline or acidic catalyst or reaction product thereof with a component selected from the group of components (A), (C) to (G), and mixtures thereof.

For 100 parts by weight of the sum total of ingredients (A), (C), (D), optionally (E), optionally (F), optionally (G) and optionally (H), the defoamer formulations preferably comprise at least 0.1 part by weight, more preferably at least 1 part by weight, most preferably at least 3 parts by weight, and not more than 50 parts by weight, more preferably not more than 40 parts by weight, and most preferably not more than 30 parts by weight of β-ketocarbonyl-functional organosilicon compounds (B).

$R^5$ is preferably a hydrocarbon radical having 1 to 18 carbon atoms. Examples of hydrocarbon radicals R are valid in their entirety for hydrocarbon radicals $R^5$. Preferred examples of radicals $R^5$ are the methyl, ethyl and phenyl radical.

Examples of radicals $R^6$ are the hydrogen atom and alkyl radicals, such as the methyl, ethyl, n-propyl, isopropyl, and n-butyl radicals. The radical $R^6$ is preferably a hydrogen atom or a methyl or ethyl radical.

$R^8$ is preferably a monovalent hydrocarbon radical which is free from aliphatic carbon-carbon multiple bonds and has 1 to 18 carbon atoms.

Examples of hydrocarbon radicals $R^8$ are alkyl radicals such as the methyl, ethyl, n-propyl, isopropyl, 1-n-butyl, 2-n-butyl, isobutyl, tert-butyl, n-pentyl, iso-pentyl, neopentyl, and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl, and methylcyclohexyl radicals; aryl radicals such as the phenyl, naphthyl, anthryl and phenanthryl radicals; alkaryl radicals such as the o-, m-, and p-tolyl radicals, xylyl radicals, and ethylphenyl radicals; and aralkyl radicals such as the benzyl radical, the α- and the β-phenylethyl radicals, and the 2-phenylpropyl radical.

Examples of substituted hydrocarbon radicals $R^8$ are hydrocarbon radicals which comprise ether or polyether groups.

Preferred examples of $R^8$ are methyl, ethyl, octyl, dodecyl, 2-phenylpropyl and phenyl radicals.

Examples of radicals $R^9$ are the hydrogen atom and alkyl radicals such as the methyl, ethyl, n-propyl, isopropyl, and n-butyl radicals and also isotridecyl, n-octyl, stearyl, 4-ethylhexadecyl, 2-octyl-1-dodecyl, or eicosanyl radicals.

The radical $R^9$ is preferably a hydrogen atom or a $C_1$-$C_{25}$-alkyl radical, such as a methyl, ethyl, or 2-octyl-1-dodecyl radical.

Preferred examples of radicals $R^7$ are the methyl, ethyl and phenyl radicals and the hydroxyl, methoxy, ethoxy, and 2-octyl-1-dodecyloxy radicals.

Polyorganosiloxanes of this kind of the formula (XIIa) with $R^7$ being a radical —$OR^9$ are obtainable, for example, through alkali-catalyzed condensation of silanol-terminated polydimethylsiloxanes and aliphatic alcohols, such as isotridecyl alcohol, n-octanol, stearyl alcohol, 4-ethyl hexadecanol, 2-octyl-1-dodecanol, or eicosanol.

The fillers (C) used in the defoamer formulations of the invention preferably have a BET surface area of 20 to 1000 $m^2/g$. The fillers (2) preferably have a particle size of less than 10 μm and an agglomerate size of less than 100 μm.

Examples of fillers (C) are silicon dioxide (silicas), titanium dioxide, aluminum oxide, metal soaps, finely ground quartz, PTFE powders, fatty acid amides such as ethylenebisstearamide, and finely divided hydrophobic polyurethanes.

Preferred for use as fillers (C) are silicon dioxide (silicas), titanium dioxide, or aluminum oxide having a BET surface area of 20 to 1000 $m^2/g$. These fillers preferably have a particle size of less than 10 μm and an agglomerate size of less than 100 μm.

Preferred as fillers (C) are silicas, especially those having a BET surface area of 50 to 800 $m^2/g$. These silicas may be fumed or precipitated silicas. Fillers (C) which can be used include not only pretreated silicas, i.e., hydrophobic silicas, but also hydrophilic silicas. Examples of commercial hydrophobic silicas which can be used in accordance with the invention are HDK® H2000, a fumed, hexamethyldisilazane-treated silica having a BET surface area of 140 $m^2/g$ (available commercially from Wacker-Chemie GmbH, Germany), and a precipitated, polydimethylsiloxane-treated silica having a BET surface area of 90 m²/g (available commercially under the name "Sipernat D10" from Degussa AG, Germany).

Hydrophilic silicas may also be hydrophobized in situ if this is advantageous for the desired activity of the defoamer formulation. There are many known methods for hydrophobizing silicas. The hydrophobization of the hydrophilic silica in situ may be accomplished, for example, by several hours of heating of the silica, in dispersion in component (A) or in a mixture of components (A), (D) and optionally (E) and optionally (F), at temperatures from 100 to 200° C. The reaction in this case may be supported through the addition of catalysts, such as KOH, and of hydrophobizing agents, such as short-chain, OH-terminated polydimethylsiloxanes, silanes, or silazanes.

The component (D) used in the defoamer formulations of the invention preferably comprises silicone resins composed of units of the formula (XI), in which, in less than 30%, preferably in less than 5%, of the units in the resin, the sum e+f is 2.

The organopolysiloxane resins composed of units of the formula (XI) are preferably
MQ resins composed of units of the formula $SiO_2$(Q units) and $R^5{}_3SiO_{1/2}$(M units), where $R^5$ has the definition specified for it above.

The molar ratio of M to Q units here is preferably in the range from 0.5 to 2.0, more preferably in the range from 0.6 to 1.0. Besides the M and Q units, the MQ resins may optionally also include small amounts of $R^5SiO_{3/2}$ (T) units or $R^5{}_2SiO_{2/2}$ (D) units, preferably in amounts of 0.01 to 20 mol %, more preferably 0.01 to 5 mol %, based on the sum of all siloxane units. These organopolysiloxane resins may further include up to 10 wt % of free, Si-bonded hydroxyl or alkoxy groups, such as methoxy or ethoxy groups.

These organopolysiloxane resins (D), at 25° C. and 101.425 kPa, preferably have a viscosity of greater than 1000 mPa·s or are solids. The weight-average molecular weight determined by gel permeation chromatography (relative to a polystyrene standard) for these resins is preferably 200 to 200,000 g/mol, more particularly 1000 to 20,000 g/mol.

Examples of polyorganosiloxanes (E) used optionally in the defoamer formulations of the invention are polydimethylsiloxanes of the formula (XIIa) having a viscosity of 10 to 1,000,000 mPa·s and cyclic polydimethylsiloxanes of the formula (XIIb) having a viscosity of 2 to 15 mPa·s, in each case at 25° C. and 101.425 kPa.

Although not indicated in formula (XIIa), these polyorganosiloxanes (E) may include 0 to 1 mol %, preferably 0 to 0.02 mol %, based on the sum of all siloxane units, of other siloxane units, such as $R^8SiO_{3/2}$ (T) units or $SiO_2$ (Q) units (where $R^8$ has the definition specified for it above).

In the defoamer formulations of the invention, water-insoluble organic compounds (F) may be used.

The term "water-insoluble" is intended in the sense of the present invention to refer to a solubility in water at 25° C. and a pressure of 101.425 kPa of not more than 3 percent by weight.

The optionally employed component (F) preferably comprises water-insoluble organic compounds having a boiling point of greater than 100° C. under the pressure of the surrounding atmosphere, in other words at 900 to 1100 hPa, more particularly those selected from mineral oils, natural oils, isoparaffins, polyisobutylenes, residues from the oxo-process alcohol synthesis, esters of low molecular mass synthetic carboxylic acids such as pentane-1,3-diol diisobutyrate, fatty acid esters such as octyl stearate, dodecyl palmitate, or isopropyl myristate, fatty alcohols, ethers of low molecular mass alcohols, phthalates, esters of phosphoric acid, and waxes.

In the defoamer formulations of the invention it is possible for polyether-modified polysiloxanes (G) to be used, which may be linear or branched and which carry at least one polyether group. Polyether-modified polysiloxanes of these kinds are known and are described for example in EP 1076073 A1, especially page 2, line 35 to page 4, line 46 (incorporated by reference).

Examples of alkaline catalysts (H) are alkali metal and alkaline earth metal hydroxides, such as NaOH, KOH, CsOH, LiGH, and $Ca(OH)_2$. Examples of acidic catalysts (H) are hydrochloric acid, sulfuric acid, and phosphorus nitride chlorides.

The reaction products of (H) with the components (A) and (C) to (G) comprise, for example, the product of the silica preferred as filler (C) with alkali metal hydroxides, such as potassium silicate or sodium silicate.

The metered addition of the catalysts may take place in typical organic solvents such as alcohols (such as methanol, ethanol, isopropanol) or esters (such as ethyl acetate).

The components (C) to (H) used in the defoamer formulations of the invention may in each case be one kind of such a component or else a mixture of at least two kinds of a respective component.

The defoamer formulations of the invention may, firstly, be prepared by known methods, such as by mixing all of the components, such as with application of high shearing forces in colloid mills, dissolvers, or rotor-stator homogenizers. In this case the mixing operation may take place under reduced pressure, in order to prevent the incorporation of air, which is present in finely divided fillers, for example. This may be followed where required by the hydrophobizing of the fillers in situ.

It is also possible first to introduce, and possibly heat, component(s) (B) and then to add in succession component(s) (A), (C), (D), optionally (E), optionally (F), optionally (G) and optionally (H).

In one preferred embodiment, component (D) is added in dissolved form as a solution in component (E) or parts of component (E), or as a solution in component (F) or parts of component (F).

In one preferred preparation method, component (B), optionally in melted form, is added to a pre-prepared formulation of components (A), (C), (D), optionally (E), optionally (F), optionally (G), and optionally (H), and the components are mixed with one another, with application of high shearing forces, in colloid mills, dissolvers, or rotor-stator homogenizers. The pre-prepared formulation of components (A), (C), (D), optionally (E), optionally (F), optionally (G), and optionally (H), may be obtained by the production methods set out above.

The defoamer formulations of the invention may be used in the form of emulsions.

The emulsions of the invention then preferably comprise defoamer formulations of the invention,
emulsifiers, and
water.

If the defoamer formulations of the invention are emulsions, emulsifiers used may be all those known to the skilled person for preparing silicone emulsions, such as anionic, cationic, or nonionic emulsifiers. Preference is given to using emulsifier mixtures, in which case at least one nonionic emulsifier ought to be included, such as sorbitan fatty acid ester, ethoxylated sorbitan fatty acid ester, ethoxylated fatty acid, ethoxylated linear or branched alcohol having 10 to 20 carbon atoms and/or glycerol esters. It is further possible to add compounds known as thickeners, such as polyacrylic acid, polyacrylates, cellulose ethers such as carboxymethylcellulose and hydroxyethylcellulose, polyurethanes, natural thickeners, such as xanthan gum, and also preservatives, and other customary additives known to the skilled person.

The continuous phase of the emulsions of the invention is preferably water. It is also possible, however, to produce defoamer formulations of the invention in the form of emulsions, wherein the continuous phase is formed by components (A), (B), (C), and (D) and optionally (E) and optionally (F) and optionally (G), and optionally (H).

These may also be multiple emulsions.

Processes for preparing silicone emulsions are known. They are typically produced by simple stirring together of all of the constituents, with optional subsequent homogenization using jet dispersers, rotor-stator homogenizers, colloid mills, or high-pressure homogenizers.

If the defoamer formulations of the invention are emulsions, preference is given to oil-in-water emulsions comprising 5 to 50 wt % of defoamer formulations of the invention comprising components (A) to (D), optionally (E), optionally (F), optionally (G), and optionally (H),
1 to 20 wt % of emulsifiers, and optionally thickeners, and 30 to 94 wt % of water.

The defoamer formulations of the invention may be used in the form of powders and thus may also be formulated as free-flowing powders. These powders are preferred in the context, for example, of application in laundry powder detergents.

Production of these powders, starting from the defoamer formulations of the invention comprising components (A) to (D), optionally (E), optionally (F), optionally (G), and optionally (H), is accomplished by methods known to the skilled person, such as spray drying or agglomerative granulation, and with additives known to the skilled person. The powders of the invention then preferably comprise defoamer formulations of the invention and carrier materials.

The powders of the invention comprise preferably 2 to 20 weight % of the defoamer formulations of the invention comprising components (A) to (D), optionally (E), optionally (F), optionally (G), and optionally (H). Carriers employed may be, for example, zeolites, sodium sulfate, sodium bicarbonate, sodium carbonate, cellulose derivatives, urea (derivatives) and sugars. The powders of the invention comprise 80 to 98 wt % of carrier materials. Further constituents of the powders of the invention may be, for example, organic waxes or organic polymers, as are described in EP-A 887097 and EP-A 1060778, for example.

The defoamer formulations of the invention may be included in detergents and cleaning compositions. The detergents and cleaning compositions of the invention then preferably comprise the defoamer formulations of the invention or the defoamer formulations of the invention in the form of emulsions or in the form of powders.

The defoamer formulations of the invention can be used wherever it has also been possible hitherto to use defoamer formulations based on organosilicon compounds.

In the examples which follow, all indications of parts and percentages, unless indicated otherwise, relate to the weight. Unless indicated otherwise, the following examples are carried out under the pressure of the surrounding atmosphere, in other words at about 1000 hPa, and at room temperature, in other words about 20° C., or at a temperature which comes about when the reactants are combined at room temperature without additional heating or cooling.

All of the viscosity figures cited in the examples are intended to be based on a temperature of 25° C. and a pressure of 101.425 kPa. They are determined in accordance with DIN EN ISO 3219: 1994 (polymers/resins in liquid, emulsified, or dispersed state) and DIN 53019 (measurement of viscosities and flow curves using rotary viscometers) on a rotary rheometer with air mounting from Anton Paar, MCR301 with plate/cone systems.

Examples

Tests of Defoamer Activity

Washing machine test with a powder laundry detergent:

A specified amount (see tables 2, 3 and 4) of defoamer formulation was added to 100 g of the defoamer-free washing powder. The washing powder was then placed, together with 3500 g of clean cotton laundry, into a drum-type washing machine (Miele Novotronik W918 without Fuzzy Logic). The wash program is then started and the height of foam is recorded over a period of 55 minutes. The foam ratings determined over the total period (0%, no measurable foam, to 100%, overfoaming) are used to determine the average foam rating. The lower this rating, the more effective the defoamer formulation over the entire period.

Preparation of Inventive β-Ketocarbonyl-Functional Organopolysiloxanes B1 and B2:

B1:

119 g of technical alkylketene dimer (available from TRIGON Chemie GmbH), prepared from a mixture of palmitic/stearic acid (about 30/70), resulting in a $C_{14}/C_{16}$ alkyl radical $R^1$, are melted at 50° C. Over a period of 30 minutes, 85 g of a polysiloxane consisting of (3-aminopropyl)methylsiloxy, dimethylsiloxy, and trimethylsiloxy units, with a viscosity of 123 $mm^2/s$ (25° C.) and an amine number of 1.99 meq/g, are added at a rate such that the temperature of the reaction mixture does not exceed 75° C. The technical alkylketene dimer product has a diketene content of 85%, resulting in an aklylketene dimer:polysiloxane stoichiometry of 1.0:1.0. After the end of addition, the temperature is raised to 100° C. and stirring is continued at this temperature for an hour. Cooling to room temperature gives a β-ketocarbonyl-functional organopolysiloxane B1 in which free amine is no longer detectable and which contains 42.6 wt % of $R^1$ groups. The melting point of the reaction product is 52° C.

B2:

133 g of the alkylketene dimer described in example 1 are reacted, in a manner analogous to example 1, with a polysiloxane consisting of (2-aminoethyl-3-aminopropyl)methylsiloxy, dimethylsiloxy, and trimethylsiloxy units, with a viscosity of 23 $mm^2/s$ (25° C.) and an amine number of 2.33 meq/g. The product is a β-ketocarbonyl-functional organopolysiloxane B2, in which free amine is no longer detectable and which contains 45.9 wt % of $R^1$ groups. The melting point of the reaction product is 37° C.

Production of the Defoamer Formulations with Components (A), (C) to (H): A1 to A4:

A1:

90 parts of a polyorganosiloxane consisting of (n-dodecyl)methylsiloxy and trimethylsiloxy units, with a viscosity of 1110 $mm^2/s$ (25° C.), 5 parts of a fumed silica having a BET surface area of 300 $m^2/g$, available commercially from Wacker-Chemie GmbH under the name HDK® T30, 5 parts of a silicone resin which is solid at room temperature and consists (according to $^{29}$Si-NMR and IR analysis) of 40 mol % $CH_3SiO_{1/2}$, 50 mol % $SiO_{4/2}$, 8 mol % $C_2H_5OSiO_{3/2}$ and 2 mol % $HOSiO_{3/2}$ units, having a weight-average molar mass of 7900 g/mol (based on polystyrene standard), are mixed using a dissolver and heated at 150° C. for four hours in the presence of 1500 ppm of KOH (in the form of a 20% strength solution in methanol). After cooling, homogenization takes place again using the dissolver. This gives a defoamer formulation A1 having a viscosity of 6040 mm$^2$/s (25° C.)

The following defoamer formulations were produced by analogous methods:

A2:

Instead of the polyorganosiloxane from example A1, a polyorganosiloxane consisting of (n-octyl)methylsiloxy and trimethylsiloxy units, with a viscosity of 681 mm$^2$/s (25° C.), was used. This gives a defoamer formulation A2 having a viscosity of 5600 mm$^2$/s (25° C.)

A3:

Instead of the polyorganosiloxane from example A1, a polyorganosiloxane consisting of (n-dodecyl)methylsiloxy, (1-phenylethyl)methylsiloxy, and trimethylsiloxy units (the former present in a molar ratio of 4:1), with a viscosity of 1320 mm$^2$/s (25° C.), was used. This gives a defoamer formulation A3 having a viscosity of 8900 mm$^2$/s (25° C.)

A4:

Instead of the polyorganosiloxane from example A1, a polyorganosiloxane consisting of dimethylsiloxy and trimethylsiloxy units, with a viscosity of 8000 mm$^2$/s (25° C.), was used. This gives a defoamer formulation A4 having a viscosity of 28,800 mm$^2$/s (25° C.).

Production of the Inventive Defoamer Formulations EF1 to EF8:

EF1:

10 g of defoamer formulation A1 are heated to 60° C. and 2 g of melted β-ketocarbonyl-functional organopolysiloxane B1 are added. The mixture is mixed using a dissolver. Cooling produces a whitish pastelike but still fluid defoamer formulation EF1.

By an analogous method, the defoamer formulations EF2 to EF8 were produced, as shown in table 1 below:

TABLE 1

| Example | Defoamer formulation Type | Amount | β-ketocarbonyl-functional organopolysiloxane Type | Amount | Appearance |
|---|---|---|---|---|---|
| EF1 | A1 | 10 g | B1 | 2 g | whitish pastelike |
| EF2 | A1 | 10 g | B2 | 2 g | yellowish pastelike |
| EF3 | A2 | 10 g | B1 | 2 g | beige pastelike |
| EF4 | A2 | 10 g | B2 | 2 g | yellowish pastelike |
| EF5 | A3 | 10 g | B1 | 2 g | whitish pastelike |
| EF6 | A3 | 10 g | B2 | 2 g | yellowish pastelike |
| EF7 | A4 | 10 g | B1 | 1.25 g | whitish pastelike |
| EF8 | A4 | 10 g | B2 | 1.25 g | yellowish pastelike |

The defoamer formulations A1, A3 and also EF1, EF2, EF5, and EF6 were tested, with a level of addition of 0.05 g per 100 g of washing powder, for their defoamer performance in the washing machine. The results of these tests are summarized in table 2.

TABLE 2

| Defoamer formulation | Average foam rating | Defoamer formulation | Average foam rating |
|---|---|---|---|
| A1 | 81% | A3 | 76% |
| EF1 | 46% | EF5 | 33% |
| EF2 | 48% | EF6 | 53% |

The defoamer formulations A4, and also EF7 and EF8 were tested, with a level of addition of 0.2 g per 100 g of washing powder, for their defoamer performance in the washing machine. The results of these tests are summarized in table 3.

TABLE 3

| Defoamer formulation | Average foam rating |
|---|---|
| A4 | 30% |
| EF7 | 18% |
| EF8 | 3% |

Tables 2 and 3 show clearly that the defoamer activity of defoamer formulations A1, A3 and A4 can be boosted significantly by combination with β-ketocarbonyl-functional organopolysiloxanes.

The defoamer formulations A2 and EF3 were tested, with different levels of addition per 100 g of washing powder, for their defoamer performance in the washing machine. The results of these tests are summarized in table 4.

TABLE 4

| Defoamer formulation | Level of addition per 100 g of washing powder | Average foam rating |
|---|---|---|
| A2 | 0.05 g | 11% |
| EF3 | 0.1 g | 0% |
| EF3 | 0.05 g | 9% |
| EF3 | 0.025 g | 6% |

Table 4 shows clearly that defoamer formulation EF3, as a combination of defoamer formulation A2 with β-ketocarbonyl-functional organopolysiloxane B1, exhibits the same defoamer performance as defoamer formulation A2 alone, at a significantly lower level of addition.

The invention claimed is:

1. A method for defoaming and/or for preventing the foaming of aqueous compositions, comprising adding a defoamer formulation comprising:

(A) at least one polydiorganosiloxane which comprises units of the formula

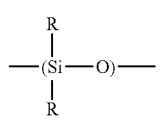

(I)

where

R each are identical or different, and are monovalent hydrocarbon radicals having 1 to 36 carbon atoms, aryl groups having 6 to 36 carbon atoms, or aralkyl groups having 7 to 36 carbon atoms, optionally containing ether or polyether groups, (B) at least one waxy, β-ketocarbonyl-functional organosilicon compound which comprises at least one Si-bonded radical B of the formula

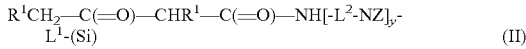

where
$R^1$ each independently is a monovalent hydrocarbon radical having at least 12 C atoms,
Z each independently is a radical of the formula $R^1CH_2-C(=O)-CHR^1-C(=O)-$ or is a radical $R^2$,
$R^2$ each is independently hydrogen or a monovalent hydrocarbon radical having 1 to 18 C atoms,
$L^1$ each independently is a divalent hydrocarbon radical having 1 to 18 C atoms,
$L^2$ each independently is a divalent hydrocarbon radical having 1 to 18 C atoms,
y is 0 or 1, and
(Si)— is a bond to Si.

2. The method of claim 1, wherein R is an alkyl group having 1-36 carbon atoms, $R^1$ has at least 14 carbon atoms, and $R^2$ is a $C_{1-4}$ alkyl radical or hydrogen.

3. The method of claim 1, wherein the polydiorganosiloxanes (A) are of the formula $$R_3SiO(R_2SiO)_dSiR_3 \quad (I')$$

where
d is an integer and has a value such that the viscosity of the polydiorganosiloxanes (A) is at least 50 mPa·s, and not more than 100,000 mPa·s, at 25° C. and 101.425 kPa.

4. The method of claim 3, wherein the viscosity of polydiorganosiloxane (A) is at least 550 mPa·s and at most 10,000 mPa·s.

5. The method of claim 1, wherein at least one waxy, β-ketocarbonyl-functional organosilicon compound (B) is an organopolysiloxane of the formula

where
$R^3$ is identical or different and is a monovalent hydrocarbon radical having 1 to 18 C atoms per radical,
$R^4$ is identical or different and is hydrogen or an alkyl radical having 1 to 8 C atoms per radical, and
h is 0 or 1,
l is an integer which is at least 1 and not more than 2000, and
k is an integer which is at least 1 and not more than 200.

6. The method of claim 5 wherein his 1.

7. The method of claim 1, wherein at least one waxy, β-ketocarbonyl-functional organosilicon compound (B) is prepared by reacting organosilicon compound(s) (1) having at least one radical A of the formula $$NH_2[-L^2-NR^2]_y-L^1-(Si) \quad (III)$$

with diketenes (2) of the formula

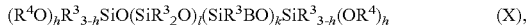

8. The method of claim 7, wherein at least one organosilicon compound (1) having at least one radical A comprises an organopolysiloxane of the formula

where
$R^3$ is identical or different and is a monovalent hydrocarbon radical having 1 to 18 C atoms per radical,
$R^4$ is identical or different and is hydrogen or an alkyl radical having 1 to 8 C atoms per radical, and
h is 0 or 1,
l is an integer which is at least 1 and not more than 2000, and
k is an integer which is at least 1 and not more than 200.

9. The method of claim 7, wherein the organosilicon compound(s) (1) having at least one radical A have an amine number of greater than 0.7 meq/g.

10. The method of claim 1, wherein in the waxy, β-ketocarbonyl-functional organosilicon compounds, radicals $R^1$ are present in an amount of at least 32 wt %, and not more than 60 wt %, based in each case on the total weight of the waxy, β-ketocarbonyl-functional organosilicon compounds.

11. The method of claim 1, wherein in addition to components (A) and (B), the defoamer formulations further comprises
(C) at least one filler, and
(D) at least one organopolysiloxane resin comprising units of the formula $$R^5_e(R^6O)_fSiO_{(4-e-f)/2} \quad (XI),$$

in which
$R^5$ are identical or different and are hydrogen or a monovalent SiC— bonded hydrocarbon radical having 1 to 30 C atoms,
$R^6$ are identical or different and are hydrogen or a monovalent hydrocarbon radical having 1 to 4 C atoms,
e is 0, 1, 2 or 3, and
f is 0, 1, 2 or 3,
with the proviso that the sum e+f is less than or equal to 3 and in less than 50% of all units of the formula (XI) in the organopolysiloxane resin, the sum e+f is 2,
(E) optionally polyorganosiloxanes different from polydiorganosiloxanes (A), of the formula

where
$R^7$ are identical or different and are $R^8$ or $—OR^9$,
$R^8$ are identical or different and are monovalent hydrocarbon radicals having 1 to 18 C atoms per radical,
$R^9$ each independently is hydrogen or a monovalent hydrocarbon radical having 1 to 25 C atoms,
m is an integer, m being selected such that the polyorganosiloxanes of the formula (XIIa) have a viscosity at 25° C. and 101.425 kPa of 10 to 1,000,000 mPas,
n is an integer, n being selected such that the polyorganosiloxanes of the formula (XIIb) have a viscosity at 25° C. and 101.425 kPa of 2 to 15 mPas,
with the proviso that the polyorganosiloxanes of the formula (XIIa) may also include a minor amount of T units ($R^8SiO_{3/2}$) and Q units ($SiO_2$) as branching units,
(F) optionally one or more water-insoluble organic compounds,
(G) optionally one or more linear or branched polyether-modified polysiloxanes, which comprise at least one polyether group,
and
(H) optionally an alkaline or acidic catalyst or reaction product thereof with a component (A), and/or (C) to (G), and mixtures thereof.

12. The method of claim 1, the defoamer formulations are used in the form of an emulsion, the emulsion comprising a defoamer formulation of claim 1, emulsifiers, and water, or are used in the form of powders, the powders comprising a defoamer formulation of claim 1 and carrier materials.

13. The method of claim 1, wherein the defoamer formulations are contained in a detergent or cleaning composition.

14. A defoamer formulation comprising:
(A) at least one polydiorganosiloxane of the formula $$R_3SiO(R_2SiO)_dSiR_3 \quad (I')$$

where
R each are identical or different, and are monovalent hydrocarbon radicals having 1 to 36 carbon atoms, aryl groups having 6 to 36 carbon atoms, or aralkyl groups having 7 to 36 carbon atoms, optionally containing ether or polyether groups,
d is an integer and has a value such that the viscosity of the polydiorganosiloxanes (A) is at least 50 mPa·s, and not more than 100,000 mPa·s, at 25° C. and 101.425 kPa, and
(B) at least one waxy, β-ketocarbonyl-functional organosilicon compound of the formula $$(R^4O)_hR^3{}_{3-h}SiO(SiR^3{}_2O)_l(SiR^3BO)_kSiR^3{}_{3-h}(OR^4)_h \quad (X),$$

where B is a radical of the general formula $$R^1CH_2\text{---}C(\!=\!O)\text{---}CHR^1\text{---}C(\!=\!O)\text{---}NH[\text{-}L^2\text{-}NZ]_y\text{-}L^1\text{-}(Si) \quad (II)$$

where
$R^1$ each independently is a monovalent hydrocarbon radical having at least 12 C atoms,
Z each independently is a radical of the formula $R^1CH_2\text{---}C(\!=\!O)\text{---}CHR^1\text{---}C(\!=\!O)\text{---}$ or is a radical $R^2$,
$R^2$ each is independently hydrogen or a monovalent hydrocarbon radical having 1 to 18 C atoms,
$L^1$ each independently is a divalent hydrocarbon radical having 1 to 18 C atoms,
$L^2$ each independently is a divalent hydrocarbon radical having 1 to 18 C atoms,
y is 0 or 1,
(Si)— is a bond to Si,
$R^3$ is identical or different and is a monovalent hydrocarbon radical having 1 to 18 C atoms per radical,
$R^4$ is identical or different and is hydrogen or an alkyl radical having 1 to 8 C atoms per radical,
h is 0 or 1,
l is an integer which is at least 1 and not more than 2000, and
k is an integer which is at least 1 and not more than 200,
wherein in addition to components (A) and (B) the defoamer formulation further comprises:
(C) fillers,
(D) organopolysiloxane resins comprising units of the formula (XI), $$R^5{}_e(R^6O)_fSiO_{(4-e-f)/2} \quad (XI),$$

in which
$R^5$ are identical or different and are hydrogen or a monovalent SiC— bonded hydrocarbon radical having 1 to 30 C atoms,
$R^6$ are identical or different and are hydrogen or a monovalent hydrocarbon radical having 1 to 4 C atoms,
e is 0, 1, 2 or 3, and
f is 0, 1, 2 or 3,
optionally
(E) polyorganosiloxanes, different from polydiorganosiloxanes (A) of the formula (XIIa) and (XIIb), $$R^7R^8{}_2SiO(SiR_2O)_mSiR_2R^7 \quad \text{or} \quad (XIIa)$$

$$R^8{}_2SiO\text{---}(SiR^8{}_2O)_n\text{---}SiR^8{}_2O \quad (XIIb)$$

$R^7$ are identical or different and are $R^8$ or $\text{---}OR^9$,
$R^8$ are identical or different and are monovalent hydrocarbon radicals having 1 to 18 C atoms per radical,
$R^9$ each independently is hydrogen or a monovalent hydrocarbon radical having 1 to 25 C atoms,
m is an integer, m being selected such that the polyorganosiloxanes of the formula (XIIa) have a viscosity at 25° C. and 101.425 kPa of 10 to 1,000,000 mPas,
n is an integer, n being selected such that the polyorganosiloxanes of the formula (XIIb) have a viscosity at 25° C. and 101.425 kPa of 2 to 15 mPas,
with the proviso that the polyorganosiloxanes of the formula (XIIa) may also include small fractions of T units ($R^8SiO_{3/2}$) and Q units ($SiO_2$) as branching units,
(F) optionally, one or more water-insoluble organic compounds,
(G) optionally, one or more linear or branched polyether-modified polysiloxanes which comprise at least one polyether group, and
(H) optionally, an alkaline or acidic catalyst or reaction product thereof with a component (A), and/or (C) to (G), and mixtures thereof.

15. The defoamer formulation of claim 14, wherein the waxy, β-ketocarbonyl-functional organosilicon compounds (B) are prepared by reacting
at least one organopolysiloxane of the formula $$(R^4O)_hR^3{}_{(3-h)}SiO(SiR^3{}_2O)_l(SiR^3AO)_kSiR^3{}_{(3-h)}(OR^4)_h \quad (VII),$$

which has an amine number of greater than 0.7 meq/g, and has at least one radical A of the formula:

$$NH_2[\text{-}L^2\text{-}NR^2]_y\text{-}L^1\text{-}(Si) \quad (III)$$

and
$R^3$ is identical or different and is a monovalent hydrocarbon radical having 1 to 18 C atoms per radical,
$R^4$ is identical or different and is hydrogen or an alkyl radical having 1 to 8 C atoms per radical, and
h is 0 or 1,
l is an integer which is at least 1 and not more than 2000,
k is an integer which is at least 1 and not more than 200, and
with diketenes (2) of the formula $$R^1\text{---}CH\!=\!C\text{---}CHR^1\text{---}C\!=\!O, \quad (IV)$$
$$\underbrace{\phantom{XXXXX}}_{O}$$

where
$R^1$ each independently is a monovalent hydrocarbon radical having at least 12 C atoms.

16. The defoamer formulation of claim 14, wherein in the waxy, β-ketocarbonyl-functional organosilicon compound, radicals $R^1$ are present in an amount of at least 32 wt %, and not more than 60 wt %, based in each case on the total weight of the waxy, β-ketocarbonyl-functional organosilicon compounds.

17. A detergent or cleaning composition comprising at least one defoamer formulation of claim 14.

* * * * *

UNITED STATES PATENT AND TRADEMARK OFFICE
CERTIFICATE OF CORRECTION

PATENT NO.         : 9,968,866 B2                     Page 1 of 1
APPLICATION NO.    : 14/896622
DATED              : May 15, 2018
INVENTOR(S)        : Christof Brehm et al.

It is certified that error appears in the above-identified patent and that said Letters Patent is hereby corrected as shown below:

In the Specification

Column 1, Line 9:
After "PCT Appln. No."
Delete "PCT/EP2014/062676 filed June 17, 2014" and
Insert -- PCT/EP2014/061836 filed June 6, 2014 --.

Column 1, Line 10:
After "German Application No."
Delete "10 2013 212 908.4 filed July 2, 2013" and
Insert -- 10 2013 210 813.3 filed June 10, 2013 --.

In the Claims

Column 18, Line 9, Claim 14:
After the formula and
Before "$R^7$ are identical or different and are $R^8$ or -$OR^9$"
Insert -- where --.

Signed and Sealed this
Twenty-third Day of October, 2018

Andrei Iancu
*Director of the United States Patent and Trademark Office*